United States Patent [19]

Bessho

[11] Patent Number: 4,912,530
[45] Date of Patent: Mar. 27, 1990

[54] OPTICAL HETERODYNE MEASURING APPARATUS

[75] Inventor: Yoshinori Bessho, Mie, Japan

[73] Assignee: Brother Kogyo Kabushiki Kaisha, Aichi, Japan

[21] Appl. No.: 307,479

[22] Filed: Feb. 8, 1989

[30] Foreign Application Priority Data

Feb. 13, 1988 [JP] Japan .................................. 63-31152

[51] Int. Cl.[4] .............................................. G01B 9/02
[52] U.S. Cl. .................................... 356/349; 356/351
[58] Field of Search ................ 356/349, 351, 357, 359

[56] References Cited

U.S. PATENT DOCUMENTS 4,558,952 12/1985 Kulgsh ................................. 356/349

Primary Examiner—Vincent P. McGraw
Assistant Examiner—S. A. Turner
Attorney, Agent, or Firm—Oliff & Berridge

[57] ABSTRACT

An optical heterodyne measuring apparatus for effecting measurement of a subject, based on a phase difference and a frequency difference between a reference beat beam consisting of two laser beams having different frequencies, and a measuring beat beam which consists of the reference beat beam reflected by the subject. The apparatus includes a light source device for producing a first reference beat beam having a first beat frequency, and a second reference beat beam having a second beat frequence which is lower than the first beat frequency, a beat frequency detecting device, and a phase difference detecting device. The beat frequency detecting device detects a beat frequency between the first beat frequency of the first reference beat beam, and a beat frequency of a first measuring beat beam which consists of the first reference beat beam reflected by the subject. The phase difference detecting device detects a phase difference between the second reference beat beam, and a second measuring beat beam which consists of the second reference beat beam reflected by the subject.

8 Claims, 3 Drawing Sheets

OPTICAL HETERODYNE MEASURING APPARATUS

BACKGROUND OF THE INVENTION

1. Field of the Invention

The present invention relates to an optical heterodyne measuring apparatus for effecting measurement based on a phase difference and a frequency difference between a reference and a measuring beat signals.

2. Discussion of the Prior Art

There is known an optical heterodyne measuring apparatus which is adapted to measure physical quantities associated with a subject, depending upon a phase difference or a frequency difference between a reference beat beam which consists of two laser beams having mutually perpendicular polarization planes and different frequencies, and a measuring beat beam which consists of the reference beat beam which has been reflected by the subject. Such a known optical heterodyne measuring apparatus usually uses a single reference beat beam whose beat frequency is equal to a difference between the frequencies of the two laser beams that constitute the reference beat beam. Therefore, the beat frequency of the reference beat beam is a fixed value which is determined by the frequencies of the two laser beams produced by a laser device.

In such a known optical heterodyne measuring apparatus, the limitation of the beat frequency of the reference beat beam causes insufficient accuracy of measurement of the subject, or a relatively limited range of the velocity of the subject to be measured. For example, where the beat frequency is comparatively high, the apparatus may follow a comparatively high speed or velocity of the subject, but suffers from comparatively low resolution of measurement (i.e., cannot measure a quantity in sufficiently small increments). Conversely, where the beat frequency is comparatively low, the resolution of measurement is sufficient for a subject moving at a relatively low speed, but the apparatus cannot sufficiently follow a comparatively high speed or velocity of the subject, whereby the velocity or position of the slowing moving subject cannot be accurately determined.

SUMMARY OF THE INVENTION

It is therefore an object of the present invention to provide an optical heterodyne measuring apparatus which permits sufficiently high resolution of measurement, and sufficiently high ability of following a rapidly moving subject.

The above object may be achieved according to the principle of the present invention, which provides an optical heterodyne measuring apparatus for effecting measurement of a subject, based on a phase difference and a frequency difference between a reference beat beam consisting of two laser beams having different frequencies, and a measuring beat beam which consists of the reference beat beam reflected by the subject, the apparatus including a light source device, a beat frequency detecting device and a phase difference detecting device. The light source device produces a first reference beat beam having a first beat frequency, and a second reference beat beam having a second beat frequency which is lower than the first beat frequency. The beat frequency detecting device detects a beat frequency between the first beat frequency of the first reference beat beam, and a beat frequency of a first measuring beat beam which consists of the first reference beat beam reflected by the subject. The phase difference detecting device detects a phase difference between the second reference beat beam, and a second measuring beat beam which consists of the second reference beat beam reflected by the subject.

In the optical heterodyne measuring apparatus of the present invention constructed as described above, the beat frequency detecting device detects the beat frequency between the comparatively high beat frequency of the first reference beat beam, and a beat frequency of a first measuring beat beam which consists of the first reference beat beam which is reflected by the subject. Thus, an amount of displacement of the subject can be measured in increments of a half of the wavelength of the laser beams, or with a resolution corresponding to the half of the laser beam wavelength. Independently of this measurement, the phase difference detecting device detects the phase difference between the second reference beat beam, and a second measuring beat beam which consists of the second reference beat beam which is reflected by the subject. Thus, an amount of displacement of the subject may be measured in increments of not larger than the half of the laser beam wavelength, or with a resolution corresponding to a value not larger than the half of the laser beam wavelength. Therefore, the instant optical heterodyne measuring apparatus assures sufficiently high resolution of measurement, and has sufficiently high ability of following the subject moving at a relatively high speed.

In one form of the invention, the light source device comprises a laser source for producing two linearly polarized laser beams having mutually perpendicular polarization planes and different frequencies, a non-polarizing beam splitter which reflects a component of each of the two linearly polarized laser beams and transmits therethrough the other component of each linearly polarized laser beam, and a frequency shifter which receives the components of the linearly polarized laser beams reflected by or transmitted through the non-polarizing beam splitter. The frequency shifter adjusts frequencies of the received laser beams so as to produce the first reference beat beam having the first beat frequency. The other components of the two linearly polarized laser beams transmitted through or reflected by the non-polarizing beam splitter provide the second reference beat beam having the second beat frequency.

In another form of the invention, the light source device comprises a first laser source for producing the first reference beat beam having the first beat frequency, and a second laser source for producing the second reference beat beam having the second beat frequency.

In a further form of the invention, the light source device comprises a laser source for producing two linearly polarized laser beams having mutually perpendicular polarization planes and different frequencies, a non-polarizing beam splitter which reflects a component of each of the two linearly polarized laser beams and transmits therethrough the other component of each linearly polarized laser beam, a first frequency shifter which receives the components of the two linearly polarized laser beams reflected by or transmitted through the non-polarizing beam splitter and which adjusts frequencies of the received laser beams, so as to produce the first reference beat beam having the first beat frequency, and a second frequency shifter which receives the other components of the laser beams transmitted through or reflected by the beam splitter and which adjusts the frequencies of the received laser beams, so as to produce the second reference beat beam having the second beat frequency.

In a still further form of the invention, the measuring apparatus further comprises a first reference-beam photosensor receiving the first reference beat beam and producing a first reference beat signal, a second reference-beam photosensor receiving the second reference beat beam and producing a second reference beat signal, a first measuring-beam photosensor receiving the first measuring beat beam and producing a first measuring beat signal, and a second measuring-beam photosensor receiving the second measuring beat beam and producing a second measuring beat signal.

According to one arrangement of the above form of the invention, the apparatus further comprises means for permitting the first and second reference beat beams to be reflected by the subject, so as to produce the first and second measuring beat beams, and directing the first and second measuring beat beams to the first and second measuring-beam photosensors. The beat frequency detecting device may comprise a first counter for counting pulses of the first reference beat signal, a second counter for counting pulses of the second reference beat signal, and means for calculating a difference between counts of the first and second counters, to thereby detect the beat frequency between the first beat frequency of the first reference beat beam, and the beat frequency of the first measuring beat beam. The phase difference detecting device may comprise a pulse generator for generating a reference pulse signal having a predetermined frequency, a gate which receives the reference pulse signal and is open for a time duration corresponding to a phase difference between the second reference beat signal and the second measuring beat signal, and a phase counter for counting pulses of the reference pulse signal for the time duration, to thereby detect the phase difference between the second reference and measuring beat beams.

BRIEF DESCRIPTION OF THE DRAWINGS

The above and other objects, features and advantages of the present invention will be better understood by reading the following description of presently preferred embodiments of the invention, when considered in connection with the accompanying drawings, in which.

DETAILED DESCRIPTION OF THE PREFERRED EMBODIMENTS

Figure 1:
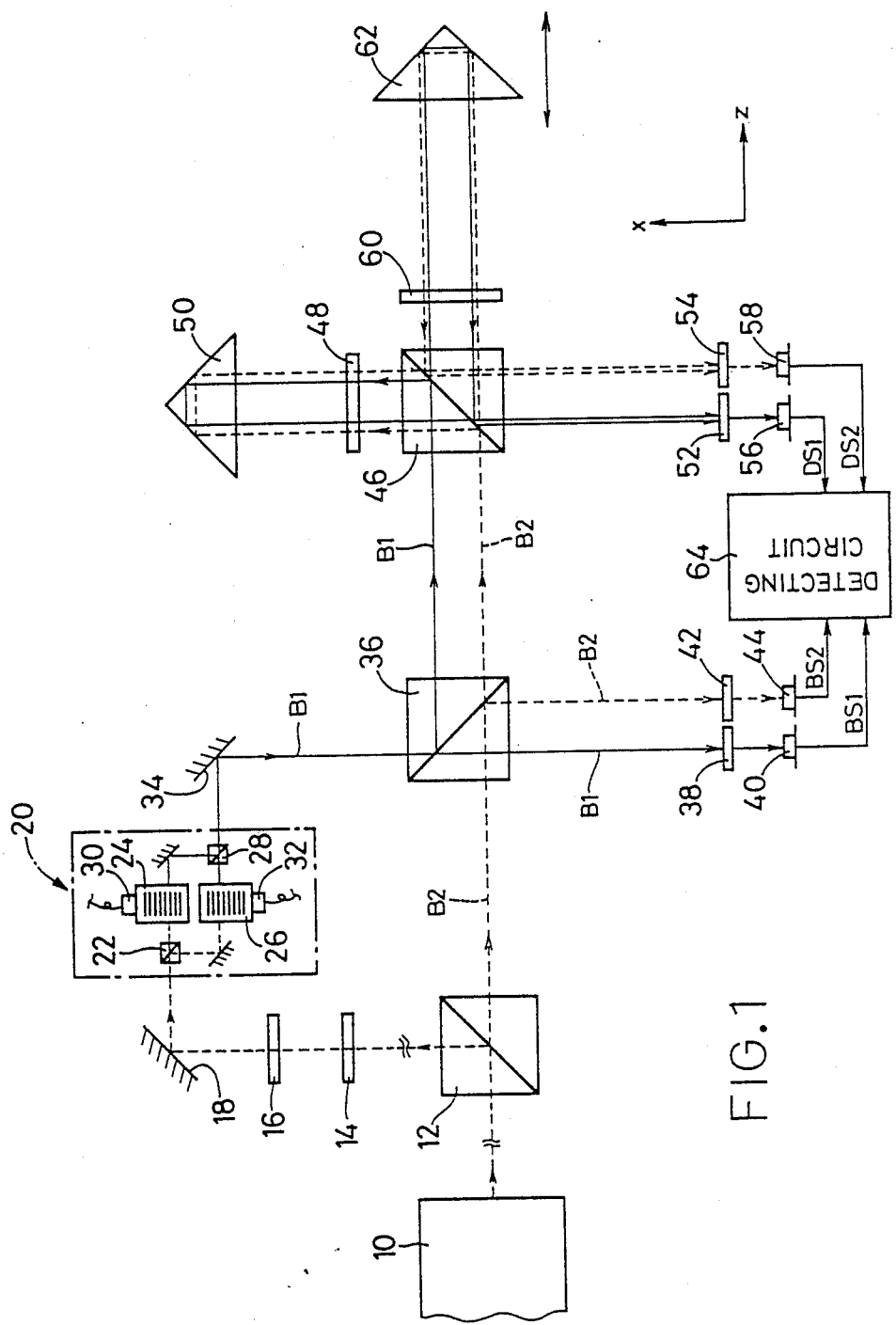
FIG. 1 is a schematic view of one embodiment of an optical heterodyne measuring apparatus of the present invention.

Referring first to FIG. 1, there is shown an optical heterodyne measuring apparatus for measuring a velocity and an amount of displacement of a corner cube 62, or a subject on which the corner cube 62 is fixed. The apparatus uses a laser device in the form of a Zeeman laser source 10 which produces two linearly polarized laser beams which have mutually perpendicular polarization planes and different frequencies. These two laser beams are incident upon a non-polarizing beam splitter 12.

A component of each of the two linearly polarized laser beams produced by the laser source 10 is reflected by the non-polarizing beam splitter 12, while the other component of each incident laser beam is transmitted through the beam splitter 12. The laser beams reflected by the beam splitter 12 is transmitted through a polarizer 14 and a ¼ waveplate 16, whereby the two linearly polarized laser beams reflected by the beam splitter 12 are converted into a circularly polarized laser beam. This circularly polarized beam is reflected by a mirror 18 and is thereby incident upon a frequency shifter 20.

The frequency shifter 20 includes, for example, a polarizing beam splitter 22 for splitting the circularly polarized laser beam from the mirror 18 into two linearly polarized laser beams, a pair of acoustooptical modulators 24, 26 which are adapted to diffract the respective linearly polarized laser beams from the beam splitter 22 and change the frequencies of the received laser beams, and a polarizing beam splitter 28 which combine the laser beams from the acoustooptical modulators 24, 26. Each modulator 24, 26 is formed of a single crystal of tellurium dioxide or molybdate, or formed of a glass material.

The acoustooptical modulators 24, 26 are provided with respective piezoelectric elements 30, 32 which produce acoustic waves, so that the incident linearly polarized laser beams are diffracted due to periodic changes in the refractive index of the substrates of the modulators 24, 26, which occur depending upon the frequencies of the acoustic waves. The frequencies of the diffracted laser beams are changed or shifted by amounts equal to the frequencies of the surface acoustic waves, due to a sort of the Doppler effect. As a result, the difference between the frequencies of the two laser beams transmitted through the acoustooptical modulators 24, 26 is increased as compared with that of the laser beams incident upon the modulators, i.e., with that of the laser beams as produced by the laser source 10. The thus frequency-shifted linearly polarized laser beams are combined with each other by a polarizing beam splitter 28, whereby there is produced a first reference beat beam B1 which has a comparatively high first reference beat frequency fHB.

In the frequency shifter 20 described above, the frequencies of drive signals applied from a suitable driver circuit to the piezoelectric elements 30, 32 are controlled so as to determine the first reference beat frequency fHB suitable for measuring the subject (corner cube prism 62). This beat frequency fHB does not exist as the light frequency of the first reference beat beam B1 as emitted from the frequency shifter 20, but should be recognized as a beat frequency of a first reference beat signal BS1 produced by a first reference-beam photosensor 40 (which will be described), which receives the two different frequencies of the two linearly polarized laser beams of the first reference beat beam B1. For the sake of easy understanding, however, the first reference beat beam B1 will be described as having the frequency fHB. Similarly, a second reference beat beam B2 will be described as having a second reference beat frequency fLB.

The first reference beat beam B1 emitted from the polarizing beam splitter 28 of the frequency shifter 20 is reflected by a mirror 34 and is split by a non-polarizing beam splitter 36, as indicated in solid lines in FIG. 1. The first reference beat beam B1 transmitted through the non-polarizing beam splitter 36 is received by the first reference-beam photosensor 40 through a polarizer 38. As a result, the first reference beat signal BS1 having the first reference beat frequency fHB is generated by the photosensor 40, as indicated above, and is applied to a detecting circuit 64. This first reference beat frequency fHB is comparatively high.

The two linearly polarized laser beams transmitted through the non-polarizing beam splitter 12 serve as the second reference beat beam B2 indicated in dashed lines in FIG. 1. The second reference beat beam B2 reflected by the beam splitter 36 is received by a second reference-beam photosensor 44 through a polarizer 42. Since this second reference beat beam B2 consists of the two linearly polarized laser beams having the mutually perpendicular polariazation planes and different frequencies as produced by the laser source 10, a second reference beat signal BS2 produced by the second reference-beam photosensor 44 has a second reference beat frequency fLB which is lower than the first reference beat frequency fHB of the first reference beat signal BS1. The second reference beat signal BS2 is also applied to the detecting circuit 64.

Each of the polarizers 38, 42 is provided to adjust the ratio of the two linearly polarized laser beams of the corresponding first or second reference beat beam B1, B2 incident upon the first and second reference-beam photosensors 40, 44.

In the present embodiment, the laser source 10, non-polarizing beam splitter 12 and frequency shifter 20 constitute a major portion of a light source device for producing the first reference beat beam B1 having the comparatively high first reference beat frequency fHB, and the second reference beat beam B2 having the comparatively low second reference beat frequency fLB. The first reference beat frequency fHB is on the order of MHz, while the second reference beat frequency fLB is on the order of a few or several hundreds of kHz.

The first reference beat beam B1 reflected by the non-polarizing beam splitter 36, and the second reference beat beam B2 transmitted through the beam splitter 36 are split by a polarizing beam splitter 46 into reference beams (S-type beams) and measuring beams (P-type beams). Described more specifically, the S-type linearly polarized beam included in the first reference beat beam B1, and the S-type linearly polarized beam included in the second reference beat beam B2 are reflected by the polarizing beam splitter 46, and are transmitted through a ¼ waveplate 48, whereby the S-type linearly polarized beams are converted into circularly polarized beams. These circularly polarized bams are reflected by a corner cube prism 50 and are again transmitted through the ¼ waveplate, whereby the circularly polarized beams are converted into two P-type linearly polarized beams whose polarization planes are rotated by 90 degrees with respect to the S-type beams. Thus, the P-type linearly polarized beams can be transmitted through the polarizing beam splitter 46, and are incident upon respective polarizers 52, 54.

On the other hand, the P-type linearly polarized beam included in the first reference beat beam B1, and the P-type linearly polarized beam included in the second reference beat beam B2 are transmitted through the beam splitter 46, and a ¼ waveplate 60, whereby the P-type beams are converted into circularly polarized beams. The circularly polarized beams are reflected by the corner cube prism 62 and are again transmitted through the ¼ waveplate 60, whereby the circularly polarized beams are converted into S-type linearly polarized beams whose polarization planes are rotated by 90 degrees with respect to the P-type beams. Accordingly, the S-type linearly polarized beams are reflected by the beam splitter 46 and are incident upon the respective polarizers 52, 54.

Therefore, the polarizer 52 receives a first measuring beat beam D1 consisting of the reference and measuring beams derived from the first reference beat beam B1. The first measuring beat beam D1 is received by a first measuring-beam photosensor 56. Similarly, the polarizer 54 receives a second measuring beat beam D2 consisting of the reference and measuring beams derived from the second reference beat beam B2. The second measuring beat beam D2 is received by a second measuring-beam photosensor 58. The first measuring-beam photosensor 56 produces a first measuring beat signal DS1 having a first measuring beat frequency fHD, while the second measuring-beam photosensor 58 produces a second measuring beat signal DS2 having a second measuring beat frequency fLD.

The corner cube prism 62 is fixed on a desired subject, while the other optical elements described above are fixedly accommodated in a suitable housing. The subject carrying the corner cube prism 62 is adapted to be moved in a Z-axis direction as indicated in FIG. 1. When the subject or corner cube prism 62 is at rest, the first measuring beat frequency fHD of the first measuring beat signal DS1 and the second measuring beat frequency fLD of the second measuring beat signal DS2 are equal to the first and second reference beat frequencies fHB and fLB of the first and second reference beat signals BS1, BS2. When the corner cube prism 62 is moved in the Z-axis direction, the measuring beams of the first and second measuring beat beams D1, D2 are subject to a Doppler frequency shift, whereby the first and second measuring beat frequencies fHD, fLD are changed relative to the first and second reference beat frequencies fHB, fLB. Therefore, an amount of the Doppler frequency shift, namely, the velocity of the corner cube prism 62 (subject) is represented by a difference between the first measuring and reference beat frequencies fHD and fHB (or corresponding phase difference), and a difference between the second measuring and reference beat frequencies fLD and fLB (or corresponding phase difference).

Figure 2:
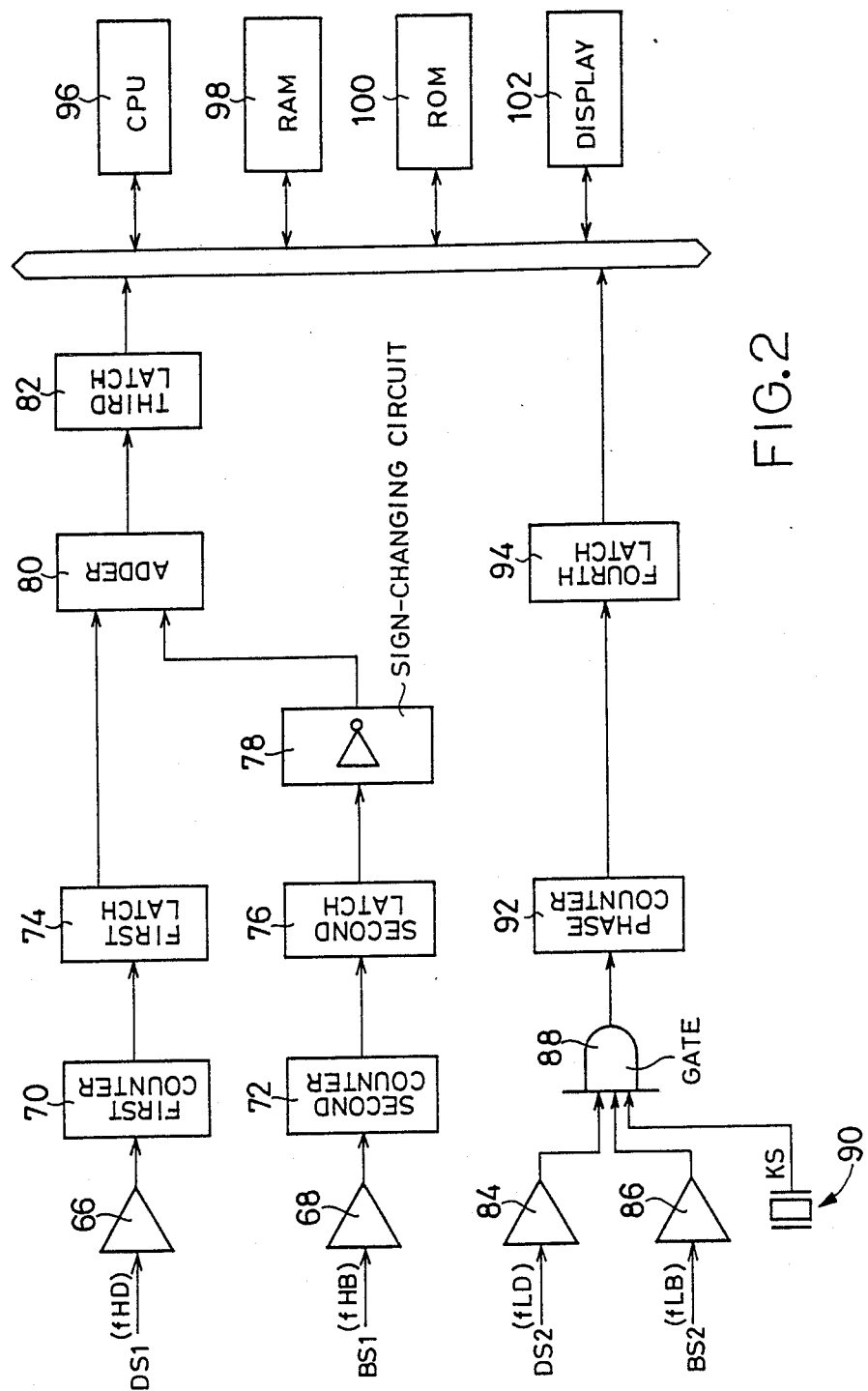
FIG. 2 is a view showing in detail a detecting circuit used in the embodiment of FIG. 1.

Referring next to FIG. 2, there is shown in detail the arrangement of the detecting circuit 64 which receives the first and second reference and measuring beat signals BS1, BS2, DS1 and DS2.

The first measuring and reference beat signals DS1, BS1 having the comparatively high first measuring and reference beat frequencies fHD, fHB are converted into rectangular pulses by respective waveform shaping elements 66, 68, which also serve to amplify the input signals. The rectangular pulses from the elements 66, 68 are counted by respective first and second counters 70, 72. Namely, the first counter 70 counts the pulses of the first measuring beat signal DS1 having the beat frequency fHD, while the second counter 72 counts the pulses of the first reference beat signal BS1 having the beat frequency fHB. Counts CD and CB obtained by the first and second counters 70, 72 after a predetermined counting period are temporarily stored in respective first and second latches 74, 76. The content of the second latch 76 is applied to a sign-changing circuit 78, wherein the sign of the input value is reversed. The output of the sign-changing circuit 78 and the content of the first latch 74 are added by an adder 80. In other words, the content of the second latch 76 is subtracted from the content of the first latch 74, and a difference (CD−CB) obtained as an output of the adder 80 is applied to a third latch 82 and temporarily stored therein. Thus, the content (CD−CB) of the third latch 82 represents the difference between the first measuring beat frequency fHD and the first reference beat frequency fHB (phase difference between the beat signals DS1 and BS1), which difference corresponds to an amount of the frequency shift Δfp which is caused by the movement of the corner cube prism 62. The difference (CD−CB) also represents the velocity of the Z-axis movement of the corner cube prism 62 (or the distance of movement per unit time), with a resolution or in increments of a half of the wavelength of the laser beams produced by the laser source 10.

On the other hand, the second measuring and reference beat signals DS2, BS2 having the comparatively low beat frequencies fLD, fLB are converted into rectangular pulses by respective waveform shaping elements 84, 86 similar to the elements 66, 68. The pulses are applied to a gate 88. This gate 88 is open for a time period during which the beat signals DS2 and BS2 are both present. A reference pulse generator 90 is provided to produce a reference pulse signal KS having a predetermined clock frequency. The gate 88 also receives clock pulses of the pulse signal KS and applies the received clock pulses to a phase counter 92, for the above-indicated time period. Accordingly, the clock pulses are counted by the phase counter 92 for the time period during which the gate 88 is open. The clock frequency of the reference pulse signal KS is 100 MHz, for example. A count C1 obtained by the phase counter 92 represents the phase difference between the second measuring and reference beat signals DS2 and BS2, that is, the movement velocity or movement distance per unit time of the corner cube prism 62, in increments of not larger than the half of the laser beam wavelength. The count C1 is stored in a fourth latch 94.

The contents of the third and fourth latches 82, 94 are processed by a CPU (central processing unit) 96, to continuously calculate the movement velocity or distance of the corner cube prism 62 and display the calculated value on a display 102, according to a control program stored in a ROM (read-only memory) 100 while utilizing temporary data storage function of a RAM (random-access memory) 98.

Suppose an amount of displacement per unit time Δt of the corner cube prism 62 in the Z-axis direction is represented by ΔZp, the amount Δfp of the Doppler frequency shift is represented by the following equation:

$$\Delta fp = (2/\lambda) \cdot (\Delta Zp/\Delta t)$$

where, λ: Wavelength of the laser beams

By integrating this equation, the movement distance Zp of the prism 62 in the Z-axis direction is obtained according to the following equation:

$$Zp = (\lambda/2) \int \Delta fp \, dt$$

The above equation is converted into the following equation:

$$Zp = (\lambda/2) \cdot (CD - CB)$$

According to the above equation, the CPU 96 calculates the movement distance Zp based on the content (CD−CB) of the third latch 82.

On the other hand, the CPU 96 calculates an amount of movement of the prism 62, in increments of not larger than the half of the wavelength of the laser beams, based on the content C1 of the fourth latch 94. The output C1 of the fourth latch 94 is an integrated value of the count of the clock pulses of the reference pulse signal KS having the frequency of 100 MHz, for a time duration corresponding to the phase difference of the second measuring and reference beat signals DS2 and BS2. Therefore, suppose the second reference beat frequency fLB is 100 kHz, the movement distance of the prism 62 may be measured with a resolution of λ/2000.

By adding the values in increments of λ/2 and the values in increments of λ/2000 corresponding to the phase difference of the beat signals DS2 and BS2, the amount or velocity of the movement of the prism 62 is eventually calculated, and displayed on the display 102. Where the phase counter 92 cannot follow a high velocity of the corner cube prism 62 because of an extremely short period of time during which the gate 88 is open, the movement amount or velocity of the prism 62 is calculated based solely on the content of the third latch 82 which is derived from the counts of the first and second latches 74, 76. Where the first and second counters 70, 72 cannot count due to an extremely low velocity (e.g., zero velocity) of the prism 62, the movement amount or velocity of the prism 62 is calculated based solely on the content of the fourth latch 94 which is derived from the phase counter 92.

It follows from the foregoing description that the first counter 70, second counter 72, sign-changing circuit 78 and adder 80 constitute a major portion of a beat frequency detecting device for obtaining the difference Δfp between the comparatively high first reference beat frequency fHB of the first reference beat signal BS1 and the comparatively high first measuring beat frequency fHD of the first measuring beat signal DS1. Thus, the amount or velocity of displacement of the corner cube prism 62 can be detected in increments of λ/2. On the other hand, the gate 88 and phase counter 92 constitute a major portion of a phase difference detecting device for obtaining the phase difference between the second reference beat signal BS2 having the comparatively low second reference beat frequency fLB and the second measuring beat signal DS2. Thus, the amount or velocity of displacement of the prism 62 can be detected in increments of not larger than λ/2. As described above, the phase difference detecting device is operable when the prism 62 is moved at an extremely low speed, while the beat frequency counting device is operable when the prism 62 is moved at an extremely high speed. Therefore, the instant optical heterodyne measuring apparatus not only has sufficiently high ability of following a high-speed movement of the subject (prism 62), but also permits high-resolution measurement.

It is also noted that the first reference beat frequency fHB of the first reference beat beam B1 or first reference beat signal BS1 can be suitably adjusted by changing the frequencies of the drive signals applied to the piezoelectric elements 30, 32 of the acoustooptical modulators 24, 26 of the frequency shifter 20, depending upon the behavior of the relevant subject (prism 62).

Figure 3:
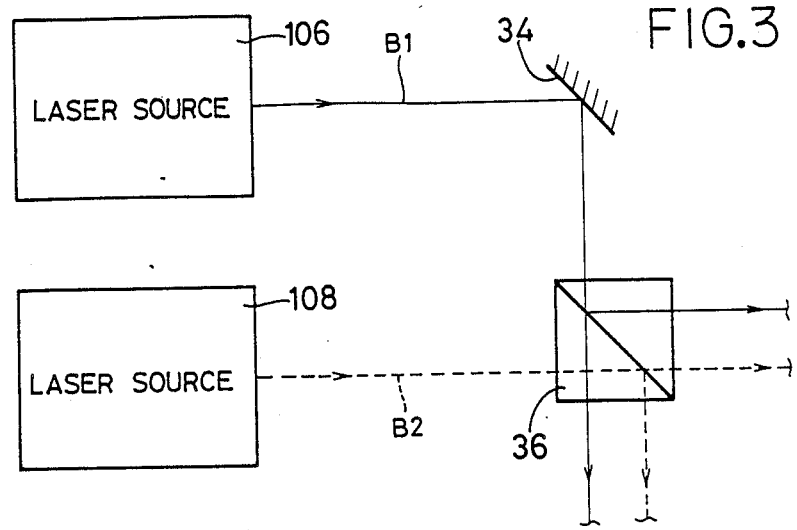
FIGS. 3 and 4 are fragmentary schematic views illustrating modified embodiments of the invention.
Figure 4:
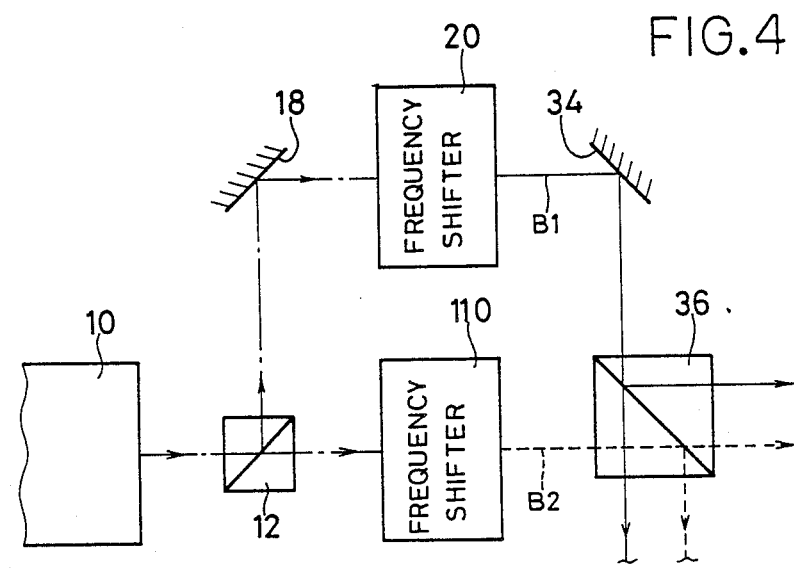

Referring next to FIGS. 3 and 4, modified embodiments of the invention will be described. For easy understanding, the same reference numerals and characters as used in FIG. 1 are used in FIGS. 3 and 4, to identify the functionally equivalent or corresponding elements and beams.

The embodiment of FIG. 3 uses two separate Zeeman laser sources 106 and 108 which produce respectively the first reference beat beam B1 having the comparatively high first reference beat frequency fHB, for example, about 5 MHz, and the second reference beat beam B2 having the comparatively low second reference beat frequency fLB, for example, about 100 kHz. Each of the first and second reference beat beams B1, B2 consists of two linearly polarized laser beams which have mutually perpendicular polarization planes and different frequencies. Thus, these two laser sources 106, 108 constitute a major portion of a light source device of the measuring apparatus.

The embodiment of FIG. 4 uses a second frequency shifter 110 disposed between the non-polarizing beam splitters 12 and 36, in addition to the first frequency shifter 20 provided in the first embodiment of FIG. 1. The second frequency shifter 110, which is constructed similarly to the frequency shifter 20, is adapted to produce the second reference beat beam B2 having the comparatively low second reference beat frequency fLB. That is, the second reference beat frequency fLB can be suitably adjusted by the second frequency shifter 110. In this embodiment, the laser source 10, non-polarizing beam splitter 12, and frequency shifters 20, 110 constitute a major portion of a light source device of the apparatus. In this case, the light source device may be adapted to produce a single linearly polarized laser beam, since the first and second frequency shifters 20, 110 may produce desired beat frequencies. However, the polarization plane of the laser beam should be inclined 45 degrees with respect to the plane of incidence of the polarizing meam splitter 46.

While the present invention has been described in its presently preferred embodiments, it is to be understood that the present invention may be embodied with various changes, modifications and improvements.

For instance, the principle of the invention is applicable to an optical heterodyne measuring apparatus for measuring physical quantities, other than the amount or velocity of a linear displacement of the subject (prism 62) as in the illustrated embodiments.

Further, a combination of the sign-changing circuit 78 and the adder 80 used in the illustrated embodiments may be replaced by a subtractor for subtracting the content of the second latch 76 from the content of the first latch 74.

It will be understood that other changes, modifications and improvements may be made in the invention, without departing from the spirit and scope of the invention defined in the following claims.

What is claimed is:

1. An optical heterodyne measuring apparatus for effecting measurement of a subject, based on a phase difference and a frequency difference between a reference beat beam consisting of two laser beams having different frequencies, and a measuring beat beam which consists of said reference beat beam reflected by said subject, wherein the improvement comprises:

a light source device for producing a first reference beat beam having a first beat frequency, and a second reference beat beam having a second beat frequency which is lower than said first beat frequency;

a beat frequency detecting device for detecting a beat frequency between said first beat frequency of said first reference beat beam, and a beat frequency of a first measuring beat beam which consists of said first reference beat beam reflected by said subject; and a phase difference detecting device for detecting a phase difference between said second reference beat beam, and a second measuring beat beam which consists of said second reference beat beam reflected by said subject.

2. An optical heterodyne measuring apparatus according to claim 1, wherein said light source device comprises a laser source for producing two linearly polarized laser beams having mutually perpendicular polarization planes and different frequencies, a non-polarizing beam splitter which reflects a first component of each of said two linearly polarized laser beams and transmits therethrough a second component of said each linearly polarized laser beam, and a frequency shifter which receives one of said first and second components of said each linearly polarized laser beam, said frequency shifter adjusting frequencies of the received laser beams so as to produce said first reference beat beam having said first beat frequency, the other of said first and second components of said two linearly polarized laser beams providing said second reference beat beam having said second beat frequency.

3. An optical heterodyne measuring apparatus according to claim 1, wherein said light source device comprising a first laser source for producing said first reference beat beam having said first beat frequency, and a second laser source for producing said second reference beat beam having said second beat frequency.

4. An optical heterodyne measuring apparatus according to claim 1, wherein said light source device comprises a laser source for producing two linearly polarized laser beams having mutually perpendicular polarization planes and different frequencies, a non-polarizing beam splitter which reflects a first component of each of said two linearly polarized laser beams and transmits therethrough a second component of said each linearly polarized laser beam, a first frequency shifter which receives one of said first and second components of said each linearly polarized laser beam and adjusts frequencies of the received laser beams, so as to produce said first reference beat beam having said first beat frequency, and a second frequency shifter which receives the other of said first and second components of said each linearly polarized laser beam and adjusts frequencies of the received laser beams, so as to produce said second reference beat beam having said second beat frequency.

5. An optical heterodyne measuring apparatus according to claim 1, further comprising a first reference-beam photosensor receiving said first reference beat beam and producing a first reference beat signal, a second reference-beam photosensor receiving said second reference beat beam and producing a second reference beat signal, a first measuring-beam photosensor receiving said first measuring beat beam and producing a first measuring beat signal, and a second measuring-beam photosensor receiving said second measuring beat beam and producing a second measuring beat signal.

6. An optical heterodyne measuring apparatus according to claim 5, further comprising means for permitting said first and second reference beat beams to be reflected by said subject, so as to produce said first and second measuring beat beams, and directing said first and second measuring beat beams to said first and second measuring-beam photosensors.

7. An optical heterodyne measuring apparatus according to claim 6, wherein said beat frequency detecting device comprises a first counter for counting pulses of said first reference beat signal, a second counter for counting pulses of said first measuring beat signal, and means for calculating a difference between counts of said first and second counters, to thereby detect the beat frequency between said first beat frequency of said first reference beat beam, and the beat frequency of said first measuring beat beam.

8. An optical heterodyne measuring apparatus according to claim 6, wherein said phase difference detecting device comprises a pulse generator for generating a reference pulse signal having a predetermined frequency, a gate which receives said reference pulse signal and is open for a time duration corresponding to a phase difference between said second reference beat signal and said second measuring beat signal, and a phase counter for counting pulses of said reference pulse signal for said time duration, to thereby detect said phase difference between said second reference and measuring beat beams.

* * * * *